United States Patent [19]

Kamiya

[11] Patent Number: 5,247,635
[45] Date of Patent: Sep. 21, 1993

[54] VECTOR PROCESSING SYSTEM FOR INVALIDATING SCALAR CACHE MEMORY BLOCK INDICATED BY ADDRESS IN TENTATIVE VECTOR STORE INSTRUCTION

[75] Inventor: Yasuaki Kamiya, Tokyo, Japan
[73] Assignee: NEC Corporation, Tokyo, Japan
[21] Appl. No.: 500,003
[22] Filed: Mar. 27, 1990
[30] Foreign Application Priority Data
Mar. 28, 1989 [JP] Japan .................................. 1-75834
[51] Int. Cl.$^5$ ........................................ G06F 15/347
[52] U.S. Cl. .................................. 395/425; 395/375; 364/736; 364/DIG. 1; 364/228.1; 364/232.21; 364/243.4
[58] Field of Search ............... 395/375, 425, 800, 925; 364/736

[56] References Cited

U.S. PATENT DOCUMENTS

| | | | |
|---|---|---|---|
| 3,949,379 | 4/1976 | Ball | 395/775 |
| 4,156,906 | 5/1979 | Ryan | 364/200 |
| 4,638,431 | 1/1987 | Nishimura | 395/425 |
| 4,722,049 | 1/1988 | Lahti | 395/375 |
| 4,881,168 | 11/1989 | Inagami et al. | 395/800 |
| 4,967,350 | 10/1990 | Maeda et al. | 395/800 |
| 5,043,886 | 8/1991 | Witek et al. | 395/425 |
| 5,063,497 | 11/1991 | Cutler et al. | 395/800 |
| 5,123,095 | 6/1992 | Papadopoulos et al. | 395/375 |

OTHER PUBLICATIONS

Hwang et al, "Proceedings of the 1986 International Conference on Parallel Processing", IEEE Computer Society, Aug. 19-22, 1986, pp. 516-518.

Primary Examiner—Thomas C. Lee
Assistant Examiner—Mehmet Geckil
Attorney, Agent, or Firm—Foley & Lardner

[57] ABSTRACT

A data processing apparatus includes an instruction issuing unit, an interval holding unit, a passing control unit, and a nullification processing unit. The instruction issuing unit tentatively issues a vector store instruction having no definitive data as an instruction not subjected to actual vector store processing. The interval holding unit obtains and holds a store interval block address to be operated by the vector store instruction tentatively issued from the instruction issuing unit. The passing control unit compares a block address indicated by a scalar load/store instruction issued from the instruction issuing unit with the store interval block address held by the interval holding unit. If the block address falls within the range of the store interval block addresses, the passing control unit causes processing for the scalar load/store instruction to wait until the vector store instruction is finally issued from the instruction issuing unit and processed. When a vector store instruction is tentatively issued from the instruction issuing unit, the nullification processing unit nullifies block data present in a store cache memory of a buffer storing unit of the apparatus and corresponding to a store address of the vector store instruction.

2 Claims, 3 Drawing Sheets

VECTOR PROCESSING SYSTEM FOR INVALIDATING SCALAR CACHE MEMORY BLOCK INDICATED BY ADDRESS IN TENTATIVE VECTOR STORE INSTRUCTION

BACKGROUND OF THE INVENTION

The present invention relates to a data processing apparatus capable of processing both scalar and vector instructions.

The following two methods are conventionally reported as a method to be performed in a data processing apparatus of this type when a vector store instruction having no definitive data is output during instruction issuing performed in accordance with an instruction issuing order designated by a program:

(1) Issuing of the vector store instruction and subsequent instructions is delayed until data is determined.

(2) Of instructions subsequent to the vector store instruction, instructions which can pass are previously issued. After data of the vector store instruction is determined, the vector store instruction is issued as if it is issued in accordance with the instruction issuing order.

If a data processing apparatus of this type has a scalar cache memory which can be accessed by only a scalar instruction, processing according to a vector store instruction is performed only in a main memory. Therefore, if data corresponding to a store address of a vector store instruction is present in a scalar cache memory, the data is nullified to ensure data consistency. Note that nullification of data in the scalar cache memory is performed in units of blocks. This nullification processing of block data in the scalar cache memory is conventionally performed by activating nullification processing unit after a vector store instruction is issued so that the unit nullifies corresponding block data.

When a vector store instruction having no definitive data is output during instruction issuing performed in accordance with an instruction issuing order designated by a program, a processing speed of a data processing apparatus using the above method (1) is inevitably reduced. In a data processing apparatus using the method (2), a processing speed can be increased since instructions which can be passed are previously issued. If, however, the data processing apparatus using the method (2), although this is the same as the apparatus using the method (1), has a scalar cache memory which can be accessed by only a scalar instruction, nullification processing must be performed for the scalar cache memory in accordance with a vector store instruction. This nullification processing can be conventionally executed only after the vector store instruction is issued and therefore is an obstacle to a higher processing speed.

SUMMARY OF THE INVENTION

The present invention has been made in consideration of the above situation, and has as its object to provide a data processing apparatus using the method (2) described above and capable of executing nullification processing of a scalar cache memory according to a vector store instruction passed by instruction issuing control before issuing of the vector store instruction.

In order to achieve the above object of the present invention, there is provided a data processing apparatus which includes: buffer storing unit having a scalar cache memory which can be accessed by only a scalar instruction; an instruction issuing unit for issuing instructions in accordance with an instruction issuing order designated by a program, tentatively issuing a vector store instruction having no definitive data as an instruction not subjected to actual vector store processing, and after data is determined, finally issuing the vector store instruction as an instruction to be subjected to the actual vector store processing by interrupting the instruction issuing order; interval holding unit for obtaining and holding a store interval block address to be operated by the vector store instruction tentatively issued from the instruction issuing unit; passing control unit for comparing a block address indicated by a scalar load/store instruction issued from the instruction issuing unit with the store interval block address held by the interval holding unit, if the block address falls outside the range of the store interval block addresses, enabling processing for the scalar load/store instruction, and if the block address falls within the range of the store interval block addresses, causing the processing for the scalar load/store instruction to wait until the vector store instruction is finally issued from the instruction issuing unit and processed; and nullification processing unit for nullifying, when a vector store instruction is tentatively issued from the instruction issuing unit, block data present in the store cache memory and corresponding to a store address of the vector store instruction.

In the data processing apparatus of the present invention, when a vector store instruction having no definitive data is output during instruction issuing performed in accordance with an instruction issuing order designated by a program, the instruction issuing means tentatively issues the vector store instruction as an instruction not to be subjected to actual vector store processing, the interval holding means obtains and holds a store interval block address to be operated by the tentatively issued vector store instruction, and the nullification processing unit nullifies block data corresponding to a store address of the vector store instruction present in the store cache memory. When the scalar load/store instruction for passing the vector store instruction is issued by the instruction issuing unit in accordance with instruction passing instruction, the passing control means compares a block address indicated by the scalar load/store instruction with the store interval block address held in the interval holding unit. If the block address is outside the range of the store interval block addresses, processing for the scalar load/store instruction is enabled. If the block data is inside the interval, the processing for the scalar load/store instruction is waited until the vector store instruction is finally issued from the instruction issuing unit and processed.

DETAILED DESCRIPTION OF THE PREFERRED EMBODIMENTS

An embodiment of the present invention will be described below with reference to the accompanying drawings.

Figure 1:
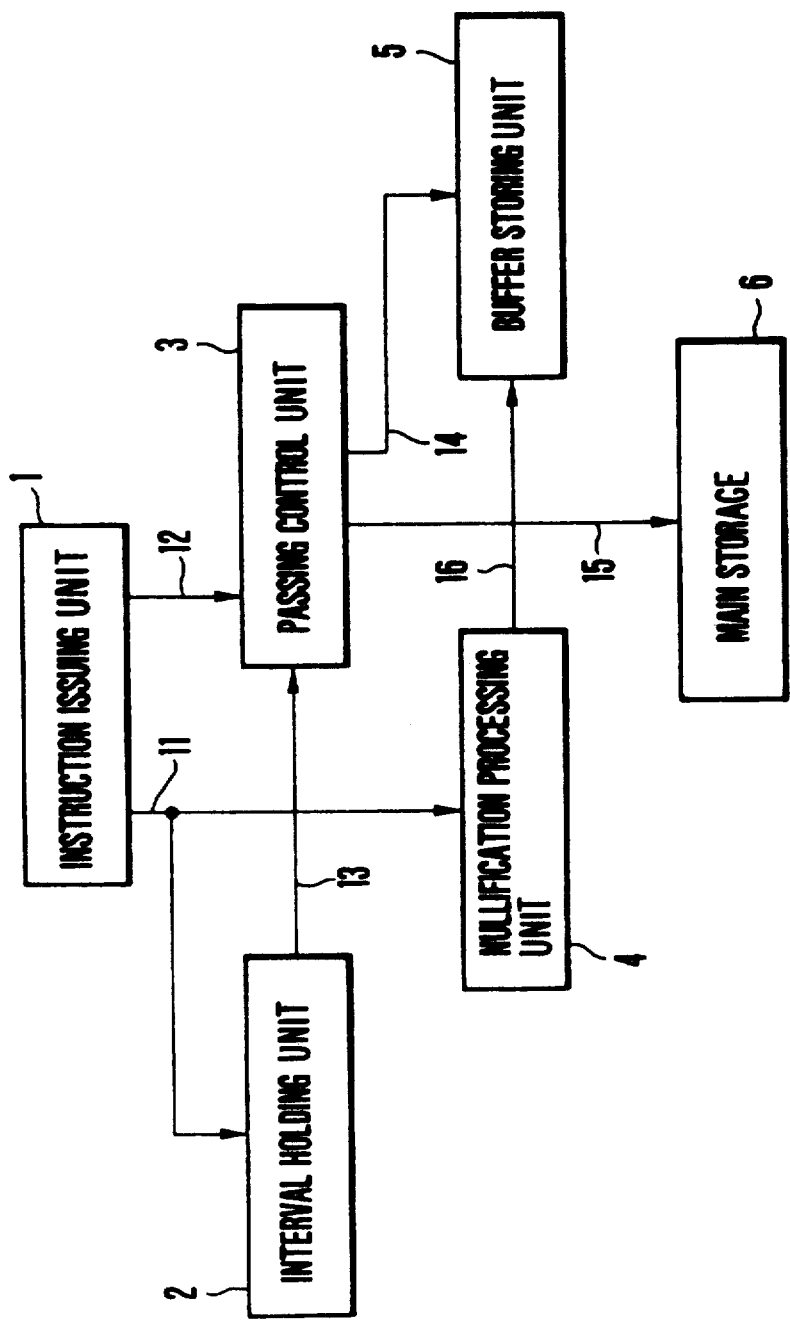
FIG. 1 is a block diagram showing a main part of an embodiment according to the present invention.

FIG. 1 shows a main part of an embodiment of a data processing apparatus according to the present invention. The data processing apparatus according to this embodiment comprises an instruction issuing unit 1, an interval holding unit 2 connected to the instruction issuing unit 1 via a tentative instruction issuing line 11, a passing control unit 3 connected to the interval holding unit 2 via an interval address data line 13 and connected to the instruction issuing unit 1 via a final instruction issuing line 12, a nullification processing means 4 connected to the instruction issuing unit 1 via the tentative instruction issuing line 11, a buffer storing unit connected to the nullification processing means 4 via a nullification processing data line 16 and connected to the passing control means 3 via an access signal line 14, and a main storage 6 connected to the passing control means 3 via the access signal line 15.

Figure 2:
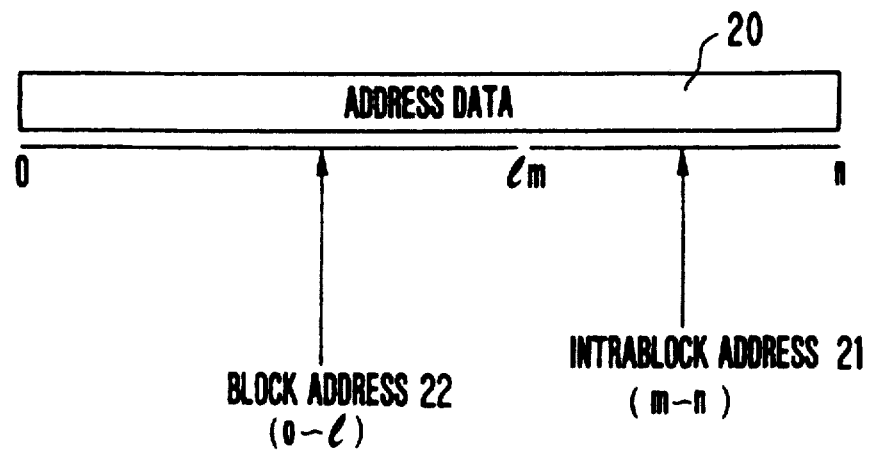
FIG. 2 is a view for explaining a format of address data.

The buffer storing unit 5 includes a scalar cache memory which can be accessed by only a scalar instruction. Assuming that address data is constituted by n bits of 0 to n as shown in FIG. 2 and the block size of block data of the scalar cache memory is $2^{(n-m+1)}$, a block address is constituted by 0 to l bits, and an intrablock address is constituted by m to n bits. Note that nullification processing of the scalar cache memory is performed in units of block data.

The instruction issuing unit 1 issues an instruction in accordance with an instruction issuing order designated by a program. If a vector store instruction having no definitive data is output, the instruction issuing unit 1 tentatively issues the vector store instruction as an instruction not to be subjected to actual vector store processing. After data is determined, the instruction issuing unit 1 interrupts the instruction issuing order to finally issue the vector store instruction as an instruction to be subjected to the actual vector store processing. Tentative issuing of the vector store instruction is performed for the tentative instruction issuing line 11 and its final issuing is performed for the final instruction issuing line 12.

The interval holding unit 2 receives a vector store instruction tentatively issued from the instruction issuing unit 1 onto the tentative instruction issuing line 11, and generates a continuous store interval address from a store start address to a store end address to be stored by the vector store instruction by using a vector store start address (B), a vector store interelement distance (D), and a vector store element number (L), all of which are designated by the vector store instruction. The interval holding unit 2 holds address data 20 of the store interval address except for an address part corresponding to the intrablock address 21 shown in FIG. 2 as a store interval block address 22 and supplies the address data to the passing control unit 3 via the interval address data line 13. Note that the store interval block address held by the interval holding unit 2 is erased when a corresponding vector store instruction is finally issued and processed.

The passing control unit 3 compares address data (scalar load/store block address) of a scalar load/store address indicated by a scalar load/store instruction issued from the instruction issuing unit 1 except for an address part corresponding to the intrablock address shown in FIG. 2 with the store interval block address supplied from the interval holding unit 2. If the scalar load/store block address falls outside the range of the store interval block address, the passing control unit 3 enables the scalar load/store instruction to, access the scalar cache memory of the buffer storing unit 5 and the main storing unit 6. If the scalar load/store block address falls within the range of the store interval block address, the passing control unit 3 causes processing for the scalar load/store instruction to wait until a vector store instruction is issued from the instruction issuing unit 1 and processed.

When a vector store instruction is tentatively issued from the instruction issuing unit 1 onto the tentative instruction issuing line 11, the nullification processing unit 4 nullifies block data present in the scalar cache memory of the buffer memory unit 5 and corresponding to a store address of the vector store instruction by using a vector store start address (B), a vector store interelement distance (D), and a vector store element number (L), all of which are designated by the tentatively issued vector store instruction.

Figure 3:
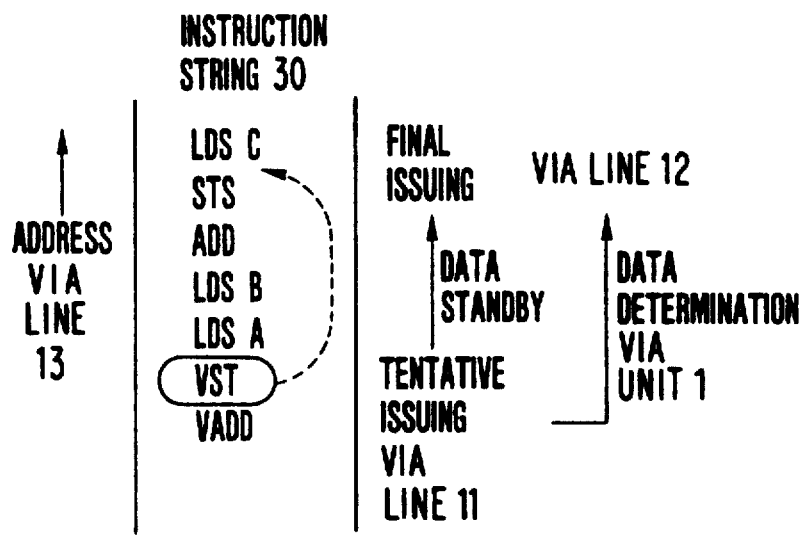
FIG. 3 is a view showing a detailed arrangement of an instruction string.

An operation of this embodiment will be described below by taking execution of a program including an instruction string as shown in FIG. 3 as an example. In the instruction string 30 shown in FIG. 3, a vector addition instruction VADD, a vector store instruction VST, scalar load instructions LDS A and LDS B, an addition instruction ADD, a scalar store instruction STS, and a scalar load instruction LDS C are arranged in an order of addresses, and store data of the vector store instruction VST indicates an arithmetic operation result of a vector addition instruction VADD of a previous instruction.

If an instruction issuing order designated by a program is the order as shown in FIG. 3, the instruction issuing unit 1 issues the respective instructions from the vector addition instruction VADD. In this case, since an arithmetic operation of the vector addition instruction VADD previous to the vector store instruction VST is not finished and the store data is not determined, the instruction issuing unit 1 tentatively issues the vector store instruction VST and issues the subsequent scalar load instruction LDS A and the like in the order of addresses. Note that if the arithmetic operation by the vector addition instruction VADD is finished and the data is determined at the timing shown in FIG. 3, the vector store instruction VST is finally issued at a position indicated by a broken line in FIG. 3, i.e., next to the scalar store instruction STS by interruption.

Figure 4A:
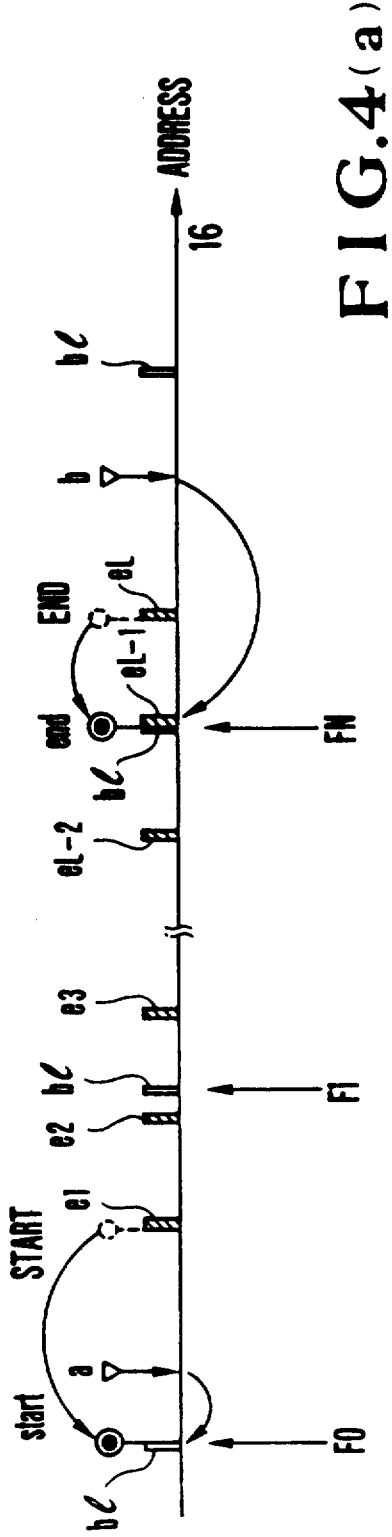
FIGS. 4A and 4B are views for explaining operations of the embodiment shown in FIG. 1.

When the vector store instruction VST is supplied via the tentative instruction issuing line 11, the interval holding means 2 calculates a store interval address {B, B+D×(L−1)} on the basis of the vector store start address (B), the vector store interelement distance (D), and the vector store element number (L) of the vector store instruction VST. The interval holding unit 2 generates and holds a store interval block address 22 obtained by removing an address part corresponding to the intrablock address 21 from the store interval address 20 and supplies the store interval block address to the passing control unit 3 via the interval address data line 13. Referring to FIG. 4A in which the abscissa indicates an address, assuming that the vector store start address (B) of the vector store instruction VST corresponds to a position of "START" and a final start address {B+D×(L−1)} corresponds to a position of "END", an operation of removing the address part corresponding to the intrablock address from the store interval address {B, B+D×(L−1)} corresponds to a shift to positions of "start" and "end" as indicated by arrows in FIG. 4A. These "start" and "end" positions correspond to start and end addresses of the store interval block. Note that in FIG. 4A, bl represents a block boundary; el to eL, elements to be stored by the vector store instruction VST; a and b, scalar load/store accesses; and F0 to FN, nullification block addresses.

When the vector store instruction VST is supplied via the tentative instruction, issuing line 11, the nullification processing unit 4 obtains the nullification block addresses F0 to FN shown in FIG. 4A on the basis of the vector store start address (B), the vector store interelement distance (D), and the vector store element number (L) of the vector store instruction VST, and nullifies block data present in the store cache memory of the buffer storing unit 5 and corresponding to the store address of the vector store instruction VST via the nullification processing data line 16. By this nullification, the block data corresponding to the store address of the vector store instruction VST is no longer present in the store cache memory.

Figure 4B:
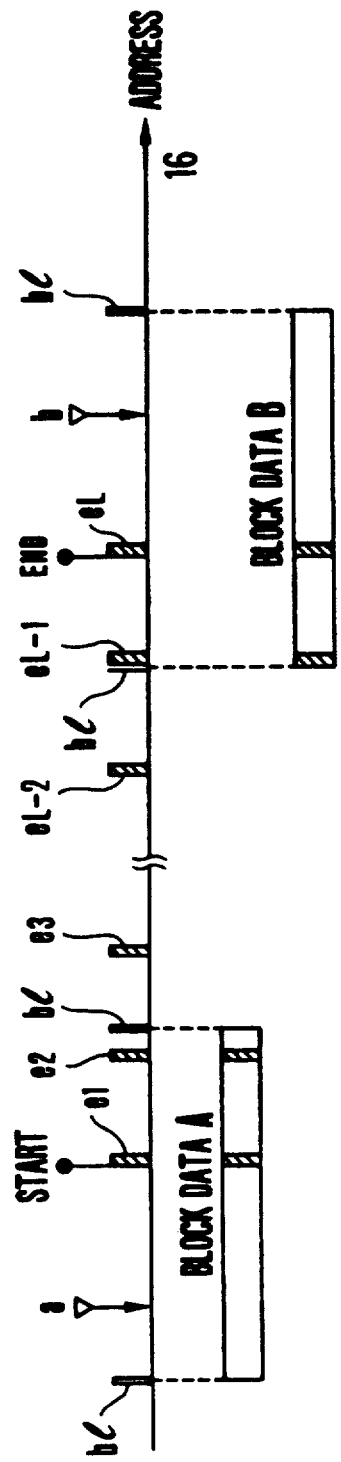

The passing control unit 3 receives an instruction supplied from the instruction issuing unit 1 via the final instruction issuing line 12 and executes processing such as passing control of the instruction or the like. As a series of operations, the passing control unit 3 compares a scalar load/store block address indicated by the scalar load/store instruction subsequent to the tentatively issued vector store instruction VST with the store interval block address supplied from the interval holding unit 2, thereby checking an address interval. If the scalar load/store block address of the scalar load/store instruction falls outside the range of the store interval block addresses, the passing control means 3 allows the scalar load/store instruction to access the buffer storing unit 5 and the main storing unit 6 via the access signal lines 14 and 15, respectively. If the scalar load/store block address falls within the range of the store interval block addresses, the passing control unit 3 causes the scalar load/store instruction to wait until the vector store instruction VST in a data standby state in the instruction issuing unit 1 is finally issued and processed after data is determined. For example, if the subsequent scalar load instruction LDS B is to access the position of a or b in FIG. 4A, the intrablock address is discarded to update the store load address as indicated by an arrow in FIG. 4A to generate a store load block address, and the created store load block address is compared with the store interval block address. In this case, since the store load block address falls within the range of the interval, the store load instruction LDS B is waited. Assume that the store load instruction LDS B is immediately executed. In this case, if a cache miss occurs in the buffer storing unit 5 (i.e., if no corresponding block data is present in the cache memory), block loading of a block data A or B shown in FIG. 4B is performed via line 16, and a block data including data to be rewritten by the vector store instruction VST indicated by a hatched portion is registered as an effective block data in the buffer storing unit 5. As a result, previously performed nullification of the cache memory according to the vector store instruction as an object to be passed becomes meaningless.

As has been described above, in the data processing apparatus of the present invention, a vector store instruction to be passed by instruction passing control is tentatively issued, and processing for a scalar load/store instruction for accessing a store interval block address to be operated by the vector store instruction is waited from a timing at which the vector store instruction is tentatively issued to a timing at which it is finally issued. Therefore, nullification of a scalar cache memory according to the vector store instruction as an object to be passed can be previously controlled to increase a processing speed of the data processing apparatus.

What is claimed is:

1. A data processing apparatus which includes a buffer storage having a scalar cache memory which can be accessed by only a scalar instruction, comprising:
   instruction issuing means for issuing instructions in accordance with an instruction issuing order designated by a program, issuing a tentative vector store instruction having no definitive data as an instruction not subjected to actual vector store processing said actual vector store processing including fetching data from said scalar cache memory and writing into the main memory, and after data is determined, finally issuing the tentative vector store instruction as an actual vector store instruction to be subjected to the actual vector store processing by interrupting the instruction issuing order;
   interval holding means, receiving said tentative vector store instruction, for obtaining and holding a store interval block address corresponding to said tentative vector store instruction;
   passing control means, receiving a scalar block address indicated by a scalar load/store instruction issued from said instruction issuing means and said store interval block address held by said interval holding means, for comparing said scalar block address and said store interval block address if the scalar block address falls outside the range of the store interval block address, enabling processing for the scalar load/store instruction, and if the block address falls within the range of the store interval block addresses, causing the processing for the scalar load/store instruction to wait until the actual vector store instruction is finally issued from said instruction issuing means and the block data in the scalar cache memory which corresponds to the interval block address is moved to the main memory; and
   nullification processing means, receiving said tentative vector store instruction, for nullifying block data present in said scalar cache memory which corresponds to a store address of the tentative vector store instruction.

2. A method of nullifying a scalar cache memory comprising the steps of:
   issuing a tentative vector store instruction having no definitive data as an instruction not subjected to actual vector store processing;
   obtaining a store interval block address from said tentative vector store instruction;
   comparing a scalar block address to said store interval block address;
   processing a scalar load/store instruction corresponding to said scalar block address when said scalar block address and said store interval address do not overlap;
   waiting to process said scalar load/store instruction until said tentative vector store instruction is issued as an actual vector store instruction and said actual vector store instruction is processed by storing the data in the cache memory which corresponds to the interval block address to the main memory, when said scalar block address and said store interval address overlap; and nullifying block data present in said scalar cache memory which corresponds to a store address of said tentative vector store instruction.

* * * * *